Figure 1:
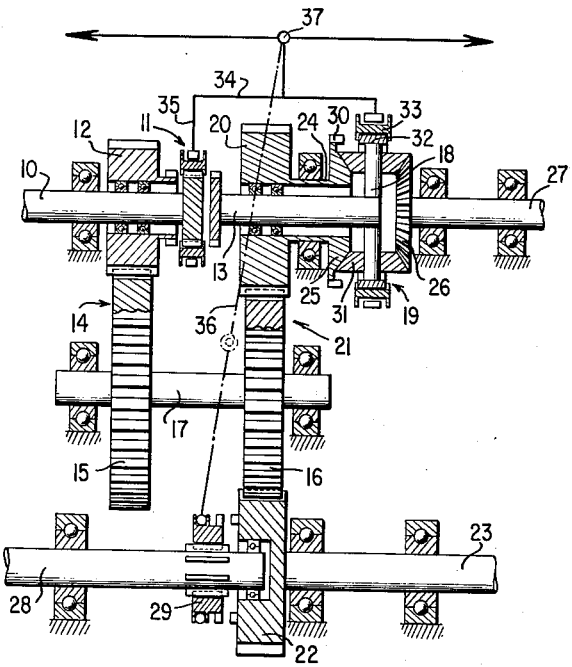

May 21, 1963     E. STUMP     3,090,254

TRANSMISSION

Filed June 7, 1961

*INVENTOR.*
EUGEN STUMP

BY
*ATTORNEYS.*

United States Patent Office 3,090,254
Patented May 21, 1963

3,090,254
TRANSMISSION
Eugen Stump, Stuttgart-Unterturkheim, Germany, assignor to Daimler-Benz Aktiengesellschaft, Stuttgart-Unterturkheim, Germany
Filed June 7, 1961, Ser. No. 115,345
Claims priority, application Germany June 10, 1960
20 Claims. (Cl. 74—710.5)

The present invention relates to a distributor gearing for multi-axle vehicles, especially trucks in which a driving or input shaft is adapted to be selectively clutched with a first transmission gearing and with a second transmission gearing, and in which the first transmission gearing effectively terminates in a gear wheel of the second transmission gearing and a drive or output is taken off from the input as well as output gear wheel of the second transmission gearing.

A distributor gearing of the type mentioned hereinabove is known per se in the art. In such prior art transmission, the drive shaft is selectively clutched by means of a sliding gear wheel either with the first gear transmission or with the input gear wheel of the second gear transmission. The first gear transmission thereby produces normally a larger change in the rotational speed whereas the second gear transmission produces a smaller or no change in the rotational speed. There exists no possibility in the known prior art transmission for an equalization between the two driven shafts or outputs so that oftentimes additional ratchet cluches of free-wheeling devices have to be interconnected with one of the driven shafts. Such known prior art construction is disadvantageous because of the complexity and likeliness of producing noises. Moreover, such prior art construction does not produce any genuine equalization between both outputs or driven shafts.

The present invention is concerned with the task of eliminating the aforementioned disadvantages. These disadvantages are solved in accordance with the present invention with distributor gears or transmissions of the type mentioned hereinabove by interconnecting between the input gear wheel of the second transmission gearing and the input or driving member a differential gear of known construction, by adapting the equalization gear wheel carrier of the differential gear to be clutched to the input or driving shaft and by connecting the input gear wheel of the second transmission gearing with the second member, for example, with a bevel gear wheel of the differential gear whereas the third member thereof, for example, the other bevel gear wheel thereof forms the output or driven member.

A genuine equalization combined with simultaneous transmission of torque between the two driven shafts is achieved in accordance with the present invention without involving therefor any substantial additional expenditures or increase in cost. Ratchet-type clutches or freewheeling devices may be dispensed with altogether. The interconnection of a differential gear between two shafts or axle members is known per se, however, such prior art constructions are without the possibility to change, with the same transmission, also the transmission ratio in the transmission of torque.

The present invention is advantageously further developed to the effect that the output gear wheel of the second transmission gearing forming the second output or driven member is additionally adapted to be clutched with another auxiliary output, for example, with the output for the front axle. Under these circumstances, the distributor gearing in accordance with the present invention may also be used for a three-axle vehicle provided with all-wheel drive during cross country drives when normally an under-drive is used.

The clutching connection of the driving or input shaft takes place by means of a shifting clutch of known construction which is adapted to be selectively clutched, on the one hand, with the input gear wheel of the first transmission gearing freely rotatably supported on the driving shaft and, on the other, with a shaft leading to equalization gear wheel carrier of the differential gear. One of the bevel gear wheels of the differential gear and the input gear wheel of the second transmission gearing which together form a gear group rotating in unison, are freely rotatably supported on the shaft leading to the equalization gear wheel carrier of the differential. The differential gear is appropriately constructed so as to be adapted to be locked in itself, and the present invention provides therefore a positive connection for the differential locking means with the shifting clutch of the input or driving shaft in such a manner that in the neutral position of the shifting clutch, the differential locking mechanism is disengaged, and upon clutching the driving shaft with the first transmission gearing the differential locking mechanism is automatically engaged.

In that manner, the differential gear may be locked automatically for the cross country drive, i.e., without separate shifting means, exclusively by the engagement of the cross-country under-drive.

The inventive concept may be further completed to the extent that the clutch for the further auxiliary output is positively connected with the shifting clutch for the input and/or with the differential locking mechanism in such a manner that in the neutral position of the shifting clutch or with a disengaged differential locking means it is also disengaged and upon clutchingly connecting the input or driving shaft with the first transmission gearing or upon engagement of the differential locking means simultaneously therewith also the auxiliary drive is engaged. As a result of such a construction, it is achieved that when passing over to cross-country under-drive the vehicle is automatically shifted to an all-wheel drive and simultaneously therewith to a locked differential gear.

The locking of the differential gear is achieved according to the present invention, by arranging outwardly at the differential or equalization gear wheel carrier a claw clutch member, for example, a toothed ring and by adapting the claw clutch member to be clutched by means of a shifting sleeve with a corresponding clutch member of the aforementioned gear groups. Possibly, the input gear of the second transmission gear may itself serve as clutching member.

Accordingly, it is an object of the present invention to provide a distributor transmission, especially for multi-axle vehicles which effectively eliminates in a simple manner the inadequacies and shortcomings of the prior art devices noted hereinabove.

It is another object of the present invention to provide a distributor gear for multi-axle vehicles which permits a genuine equalization between the outputs together with a simultaneous transmission of torque between the several driven axle shafts.

Still another object of the present invention resides in the provision of a distributor gear of the type mentioned hereinabove provided with a genuine equalization between the two outputs thereof which eliminates the likelihood of high noise production as well as entails simplification in the construction thereof.

A further object of the present invention resides in the provision of a distributor charge-speed gearing of the type described hereinabove which eliminates the requirements for free-wheeling devices, ratchet-type clutches or the like to produce an equalization between the several outputs thereof.

A further object of the present invention resides in the provision of a distributor gearing provided with equalization means in the form of a differential gear and with control means operative to automatically lock the equalization means upon engagement of the under-drive engaged during cross country drives.

Still another object of the present invention resides in the provision of control means operative with a distributor change-speed gearing of the type mentioned hereinabove in which an all-wheel drive is automatically engaged with the engagement of the under-drive provided, for example, for cross country driving.

Figure 2:
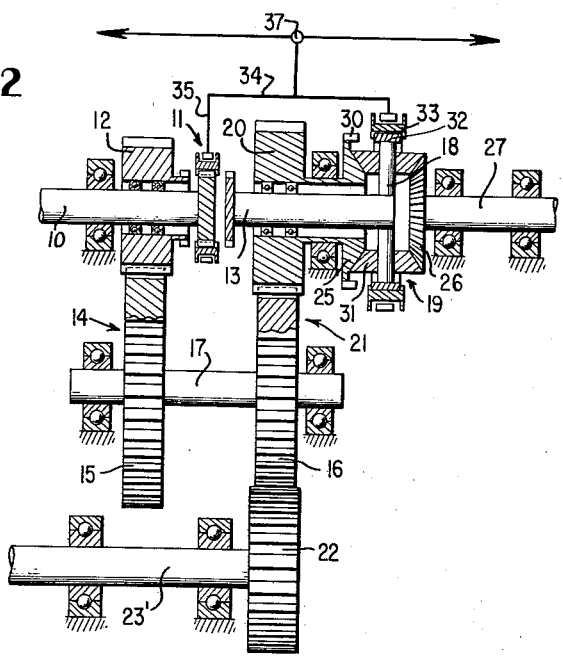

These and other objects, features and advantages of the present invention will become more obvious from the following description when taken in connection with the accompanying drawing which shows, for purposes of illustration only, two embodiments in accordance with the present invention, and wherein FIGURE 1 is a schematic view of a distributor gearing in accordance with the present invention, and FIGURE 2 is a schematic view of a modified embodiment of a distributor gearing in accordance with the present invention.

Referring now to the drawing wherein like reference numerals are used throughout the two views to designate corresponding parts, and more particularly to FIGURE 1, reference numeral 10 designates therein the input or driving shaft which is adapted to be selectively connected by means of a shifting clutch generally designated by reference numeral 11 and of any known suitable construction with either the gear wheel 12 or with the shaft 13. The gear wheel 12 is freely rotatably supported on the driving shaft 10 and forms the input gear of the first transmission gearing generally designated by reference numeral 14, the intermediate gear wheel 15 and the output gear wheel 16 of which are securely mounted on an intermediate shaft 17 for common rotation therewith.

The shaft 13 is operatively connected in any suitable manner for common rotation with the differential or equalization gear wheel carrier 18 of a differential gear generally designated by reference numeral 19 which may be of any known construction. A gear wheel 20 is freely rotatably mounted on shaft 13 which gear wheel 20 forms the input gear of a second transmission gearing generally designated by the reference numeral 21. Additionally, forming part of this second transmission gearing 21 are the output gear wheel 16 of the first transmission gearing 14 which in that case forms an intermediate gear, and an output gear wheel 22 which is securely connected for rotation in unison with a driven or output shaft 23. The output or driven shaft 23 leads, by the interposition of suitable known joints, to the rear axle.

The input gear wheel 20 of the second transmission gearing 21 is securely connected by means of a hollow shaft 24 with the first bevel gear 25 of the differential gear 19 so that both gears 20 and 25 form a gear group rotating in unison. The second bevel gear 26 of the differential gear 19 is securely connected with a driven or output shaft 27 which also leads, by the interposition of known conventional joints, to the other rear axle.

Coaxially arranged to the output or driven shaft 23 is an additional output or driven shaft 28 which may lead to the front axle of a truck type vehicle and which is adapted to be operatively connected by means of a disengageable claw clutch 29 or the like with the output gear wheel 22 of the second transmission gearing 21 and therewith is adapted to be rigidly connected by means of the claw clutch 29 with the driven shaft 23.

A claw clutch member 30 of any conventional construction is operatively associated with the gear group consisting of the bevel gear 25 and the gear wheel 20 which claw clutch member 30 in the illustrated embodiment is constructed as externally-toothed ring gear and is secured, for example, on the hollow shaft 24 directly adjacent the bevel gear 25. A corresponding claw clutch member 32 is arranged outwardly at the carrier 18 for the equalization bevel gears 31. A shifting sleeve 33 of conventional construction engages into the claw clutch member 32 which sleeve 33 is adapted to be displaced in the axial direction thereof by means of a shifting lever 34. The shifting lever 34 is operatively connected with the shifting lever 35 for the shifting clutch 11. Both shifting levers 34 and 35 may be connected together through a transmission linkage 36 with the disengageable claw clutch 29 for the additional output or driven shaft 28.

*Operation*

The operation of the distributor transmission in accordance with the present invention, as illustrated in FIGURE 1 is as follows.

In the position illustrated in FIGURE 1, the change-speed gearing or transmission is in the neutral position thereof, i.e., the shifting clutch 11 is in the neutral position thereof. The linkage is thereby so arranged and constructed that in this neutral position both the differential locking mechanisms 30, 32 and 33 as well as the clutch 29 are disengaged.

If now the shifting clutch 11 is displaced by means of the common shifting lever 37 toward the right as viewed in FIGURE 1, then the input or driving shaft 10 is connected with the shaft 13 and therewith also with the equalization gear wheel carrier 18 to rotate in unison therewith. The transmission of torque or of the drive takes place from the equalization gear wheel carrier 18 to the one bevel gear 25 and the second transmission gearing 21 to output or driven shaft 23. Simultaneously therewith, the other bevel gear 26 drives the other output or driven shaft 27. Since the transmission gearing 21 produces a transmission ratio of 1:1 both driven shafts 23 and 27 are driven at the speed of the driving shaft 10 with the interposition of the differential gear 19. Both the differential locking mechanism and the clutch 29 remain disengaged.

If the shifting lever 37 is now displaced from the neutral position illustrated in the drawing toward the left as viewed in FIGURE 1, then the input or driving shaft 10 is clutched with the input gear wheel 12 of the first transmission gearing 14. Simultaneously therewith, the shifting sleeve 33 of the differential blocking means clutchingly connects with each other the two claw clutch members 30 and 32 so that the differential gear 19 rotates as a unit. Furthermore, the auxiliary output or driven shaft 28 may be securely connected for rotation in unison with the driven shaft 23 by means of the claw clutch 29. The transmission of torque now takes place from the driving shaft 10 through the gear wheels 12 and 15 of the first transmission gearing 14 to the output gear wheel 16 thereof. This transmission takes place with a speed reduction.

The gear wheels 20 and 22 of the second transmission gearing 21 are now driven from the output gear wheel 16 of the first transmission gearing 14 whereby gear wheels 20 and 22, in turn, drive through the differential 19 the driven shaft 27 as well as the two driven shafts 28 and 23 now rigidly connected with each other. A differential effect is not present nor is any such effect intended since this position represents the cross country under-drive with an all wheel drive.

Whereas the distributor change-speed gearing illustrated in FIGURE 1 is suitable for a three-axle installation, FIGURE 2 illustrates the arrangement, identical in principle to that of FIGURE 1, but suitable for a two-axle installation. The construction and arrangement of the transmission gearings 14 and 21 and of the differential gear 19 is the same as that in FIGURE 1. Also, of identical construction and arrangement are the shifting clutch 11 and shifting sleeve 33 for locking the differential gear 19.

FIGURE 2 differs from FIGURE 1 only by the fact that the output gear wheel 22 of the second transmission gearing 21 is now securely connected exclusively with the driven shaft 23' which in that case now extends forwardly to the front axle of the vehicle whereas the other driven shaft 27 connected to the differential gear 19 drives the rear axle in the manner described already hereinabove.

The operation of the distributor gearing according to FIGURE 2 is the same in principle as that of FIGURE 1. Upon displacement of the shifting lever 37 toward the right there is engaged the normal driving speed whereby the output or driven shafts 23' and 27 are driven by the interposition of the differential gear 19. The cross-country under-drive is engaged upon displacement of the shifting lever 37 toward the left whereby the differential gear 19 is blocked in itself and the two driven shafts 23' and 27 are rigidly connected for rotation in unison with each other. The drive thereby takes place with a transmission ratio representing a speed reduction.

While I have shown and described two embodiments in accordance with the present invention, it is understood that the same is not limited thereto but is susceptible of many changes and modificactions within the spirit and scope thereof. For example, there also exists the possibility to arrange the wheels 20 and 30 directly adjacent one another or possibly make the same of one piece. The input gear wheel 20 may thereby serve itself as clutching member for the differential locking means. As a result of such an arrangement, the structural length of the transmission may be reduced and the separate ring gear 30 may be dispensed with.

Thus, it is obvious that the present invention is not limited to the details shown and described herein, but is susceptible of many changes and modifications and I, therefore, do not wish to be limited to the details shown and described herein but intend to cover all such changes and modifications as are encompassed by the scope of the appended claims.

I claim:

1. A distributor gearing for multi-axle vehicles, comprising input means, first transmission gear means, second transmission gear means, each of said transmission gear means having a plurality of gear wheels, said first transmission gear means effectively terminating in one of the gear wheels of said second transmission gear means, differential gear means including a plurality of elements, first output means operatively connected wtih one of the elements of said differential gear means, a first one of the gear heels of said second transmission gear means being operatively connected with another element of said differential gear means, second output means operatively connected with a second gear wheel of said second transmission gear means, and means including shifting means for selectively connecting said input means with one of the gear wheels of said first transmission gear means or with a further element of said differential gear means, said further element comprising equalization gear carrier means, a shaft fixed to said equalization gear carrier means, said means including shifting means further including a clutch member fixed to said shaft, a clutch member fixed to one of said gear wheels of said first transmission gear means, said shifting means comprising a clutch member slidably but non-rotatably mounted on said input means and selectively engageable with said first-mentioned clutch member or with said second-mentioned clutch member.

2. A distributor transmission for multi-axle vehicles, especially trucks, comprising input means, first transmission gear means, second transmision gear means, said first transmission gear means having a plurality of gear wheels including an input gear wheel and an output gear wheel and said second transmission gear means having a plurality of gear wheels including an input gear wheel and an output gear wheel, differential gear means, first output means, second output means operatively connected with the output gear wheel of said second transmission gear means, said first transmission gear means effectively terminating in one of the gear wheels of said second transmission gear means, said differential gear means including equalization gear carrier means, equalization gear means on said carrier means, and two bevel gear means operatively connected with said equalization gear means, said first output means being operatively connected with one of said bevel gear means, the input gear wheel of said second transmission gear means being operatively connected with the other bevel gear means, and means including clutch means for selectively connecting said input means with the input gear wheel of said first transmission gear means or with said equalization gear carrier means, said means including clutch means further including a shaft fixed to said equalization gear carrier means, said clutch means comprising a clutch member fixed to said shaft, a clutch member fixed to said input gear wheel of said first transmission gear means, a shiftable clutch member slidably but non-rotatably mounted on said input means and selectively engageable with said first-mentioned clutch member or with said second-mentioned clutch member.

3. A distributor gearing for multi-axle vehicles, comprising input means, first transmission gear means, second transmission gear means, each of said transmission gear means having a plurality of gear wheels, said first transmission gear means effectively terminating in one of the gear wheels of said second transmission gear means, differential gear means including a plurality of elements, first output means operatively connected with one of the elements of said differential gear means, a first one of the gear wheels of said second transmission gear means being operatively connected with another element of said differential gear means, second output means operatively connected with a second gear wheel of said second transmission gear means, third output means adapted to be connected with said second gear wheel of said second transmission gear means, and means including shifting means for selectively connecting said input means with one of the gear wheels of said first transmission gear means or with a further element of said differential gear means, said further element of said differential gear means comprising equalization gear carrier means, said means including shifting means further including a clutch member fixed to said one of the gear wheels of said first transmission gear means, a shaft fixed to said equalization gear carrier means, a clutch member fixed to said shaft, said shifting means comprising a shiftable clutch element slidably but non-rotatably mounted on said input means and selectively engageable with said first-mentioned clutch member or with said second-mentioned clutch member.

4. A distributor transmission for multi-axle vehicles, especially trucks, comprising input means, first transmission gear means, second transmission gear means, said first transmission gear means having a plurality of gear wheels including an input gear wheel and an output gear wheel and said second transmission gear means having a plurality of gear wheels including an input gear wheel and an output gear wheel, differential gear means, first output means, second output means operatively connected with the output gear wheel of said second transmission gear means, third output means adapted to be connected with said output gear wheel of said second transmission gear means, clutch means for selectively connecting said third output means with the output gear wheel of said second transmission gear means, said first transmission gear means effectively terminating in one of the gear wheels of said second transmission gear means, said differential gear means including equalization gear carrier means, equalization gear means on said carrier means, and two bevel gear means operatively connected with said equalization gear means, said first output means being operatively connected with one of said bevel gear means, the input gear wheel of said second transmission gear means being operatively connected with the other bevel gear means, and means including clutch means for selectively connecting said input means with the input gear wheel of said first transmission gear means or with said equalization gear carrier means, said means including clutch means further including a shaft fixed to said equalization gear carrier means, said clutch means comprising a clutch member fixed to said shaft, a clutch member fixed to said input gear wheel of said first transmission gear means, a shiftable clutch member slidably but non-rotatably mounted on said input means and selectively engageable with said first-mentioned clutch member or with said second-mentioned clutch member.

5. A distributor gearing for multi-axle vehicles, comprising input means, first transmission gear means, second transmission gear means, each of said transmission gear means having a plurality of gear wheels including an input gear wheel and an output gear wheel, the input gear wheel of said first transmission gear means being freely rotatably supported on said input means, said first transmission gear means effectively terminating in one of the gear wheels of said second transmission gear means, differential gear means provided with a plurality of elements and including an equalization gear carrier, a shaft operatively connected with said equalization gear carrier, first output means operatively connected with one of the elements of said differential gear means, the input gear wheel of said second transmission gear means being operatively connected with another element of said differential gear means and being both freely rotatably mounted on said shaft, second output means operatively connected with the output gear wheel of said second transmission gear means, and clutch means for selectively connecting said input means with the input gear wheel of said first transmission gear means or with said shaft leading to the gear carrier of said differential gear means, said clutch means including a clutch member fixedly secured to said input gear wheel of said first transmission gear means, a clutch member fixedly secured to said shaft, and a clutch member slidably but non-rotatably mounted on said input means, said last-mentioned clutch member being selectively engageable with said first-mentioned clutch member or with said second-mentioned clutch member.

6. A distributor gearing for multi-axle vehicles, comprising input means, first transmission gear means, second transmission gear means, each of said transmission gear means having a plurality of gear wheels including an input gear wheel and an output gear wheel, the input gear wheel of said first transmission gear means being freely rotatably supported on said input means, said first transmission gear means effectively terminating in one of the gear wheels of said second transmission gear means, differential gear means provided with a plurality of elements and including an equalization gear carrier, a shaft operatively connected with said equalization gear carrier, first output means operatively connected with one of the elements of said differential gear means, the input gear wheel of said second transmission gear means being operatively connected with another element of said differential gear means and being both freely rotatably mounted on said shaft, second output means operatively connected with the output gear wheel of said second transmission gear means, means for selectively locking said differential gear means to rotate as a unit and clutch means for selectively connecting said input means with the input gear wheel of said first transmission gear means or with said shaft leading to the gear carrier of said differential gear means, said clutch means comprising a clutch member fixed to said input gear wheel of said first transmission gear means, a clutch member fixed to said shaft and a shiftable clutch member slidably but non-rotatably mounted on said input means, said shiftable clutch member being selectively engageable with said first-mentioned clutch member or with said second-mentioned clutch member.

7. A distributor change-speed gearing for multi-axle vehicles, comprising input means, first transmission gear means, second transmission gear means, each of said transmission gear means having a plurality of gear wheels including an input gear wheel and an output gear wheel, said first transmission gear means effectively terminating in one of the gear wheels of said second transmission gear means, differential gear means including a plurality of elements, first output means operatively connected with one of the elements of said differential gear means, a first one of the gear wheels of said second transmission gear means being operatively connected with another element of said differential gear means, second output means operatively connected with a second gear wheel of said second transmission gear means, third output means and means including clutch means for selectively connecting said third output means with said output gear wheel of said second transmission gear means and for selectively connecting said input means with one of the gear wheels of said first transmission gear means or with a further element of said differential gear means, said means including clutch means further comprising a shaft secured to said further element of said differential gear means, said clutch means comprising a clutch member secured to said shaft, a clutch member secured to said one of the gear wheels of said first transmission gear means, a shiftable clutch member slidably but non-rotatably mounted on said input means and selectively engageable with said first-mentioned clutch member or with said second-mentioned clutch member.

8. A distributor transmission for multi-axle vehicles, especially trucks, comprising input means, first transmission gear means, second transmission gear means, said first transmission gear means having a plurality of gear wheels including an input gear wheel and an output gear wheel and said second transmission gear means having a plurality of gear wheels including an input gear wheel and an output gear wheel, differential gear means, first output means, second output means operatively connected with the output gear wheel of said second transmission gear means, said first transmission gear means effectively terminating in one of the gear wheels of said second transmission gear means, said differential gear means including equalization gear carrier means, equalization gear means on said carrier means, and two bevel gear means operatively connected with said equalization gear means, said first output means being operatively connected with one of said bevel gear means, the input gear wheel of said second transmission gear means being operatively connected with the other bevel gear means to effectively form a gear group rotating in unison, differential locking means for selectively connecting said equalization gear carrier means with said gear group, and means including clutch means for selectively connecting said input means with the input gear wheel of said first transmission gear means or with said equalization gear carrier means, said means including clutch means further including a shaft secured to said equalization gear carrier means, said clutch means comprising a clutch member secured to said shaft, a clutch member carried by said input gear wheel of said first transmission gear means, a shiftable clutch member slidably but non-rotatably mounted on said input means and selectively engageable with said first-mentioned clutch member or with said second-mentioned clutch member.

9. A distributor transmission for multi-axle vehicles, especially trucks, comprising input means, first transmission gear means, second transmission gear means, said first transmission gear means having a plurality of gear wheels including an input gear wheel and an output gear wheel and said second transmission gear means having a plurality of gear wheels including an input gear wheel and an output gear wheel, differential gear means, first output means, second output means operatively connected with the output gear wheel of said second transmission gear means, said first transmission gear means effectively terminating in one of the gear wheels of said second transmission gear means, said differential gear means including equalization gear carrier means, equalization gear means on said carrier means, and two bevel gear means operatively connected with said equalization gear means, said first output means being operatively connected with one of said bevel gear means, a hollow shaft provided with external claw clutch means and operatively connecting the input gear wheel of said second transmission gear means with the other bevel gear means, said equalization gear carrier means being provided with external claw clutch means, means for locking said differential gear means including a shifting sleeve operative to connect with each other said claw clutch means, and means including clutch means for selectively connecting said input means with the input gear wheel of said first transmission gear means or with said equalization gear carrier means, said means including clutch means further including a shaft connected to said equalization carrier means, said clutch means comprising a clutch member on said shaft, a clutch member on said input gear wheel of said first transmission gear means, a shiftable clutch member splinned to said input member and selectively engageable with said first-mentioned clutch member or with said second-mentioned clutch member.

10. A distributor transmission for multi-axle vehicles, especially trucks, comprising input means, first transmission gear means, second transmission gear means, said first transmission gear means having a plurality of gear wheels including an input gear wheel and an output gear wheel and said second transmission gear means having a plurality of gear wheels including an input gear wheel and an output gear wheel, differential gear means, first output means, second output means operatively connected with the output gear wheel of said second transmission gear means, said first transmission gear means effectively terminating in one of the gear wheels of said second transmission gear means, said differential gear means including equalization gear carrier means, equalization gear means on said carrier means, and two bevel gear means operatvely connected with said equalization gear means, said equalization gear carrier means being provided with external claw clutch means, said first output means being operatively connected with one of said bevel gear means, the input gear wheel of said second transmission gear means effectively constituting also itself a claw clutch member and being operatively connected with the other bevel gear means, differential gear locking means including shifting sleeve means for connecting said claw clutch means with said claw clutch member, and means including clutch means for selectively connecting said input means with the input gear wheel of said first transmission gear means or with said equalization gear carrier means, said means including clutch means further comprising a shaft secured to said equalization gear carrier means, said clutch means comprising a clutch member secured to said shaft, a clutch member secured to said input gear wheel of said first transmission gear means, a shiftable clutch member mounted on said input means for slidable, non-rotatable movement relative thereto, said shiftable clutch member being selectively engageable with said first-mentioned clutch member or with said second-mentioned clutch member.

11. A distributor transmission for multi-axle vehicles, especially trucks, comprising input means, first transmission gear means, second transmission gear means, said first transmission gear means having a plurality of gear wheels including an input gear wheel and an output gear wheel and said second transmission gear means having a plurality of gear wheels including an input gear wheel and an output gear wheel, differential gear means, first output means, second output means operatively connected with the output gear wheel of said second transmission gear means, said first transmission gear means effectively terminating in one of the gear wheels of said second transmission gear means, said differential gear means including equalization gear carrier means, equalization gear means on said carrier means, and two bevel gear means operatively connected with said equalization gear means, said first output means being operatively connected with one of said bevel gear means, a hollow shaft operatively connecting the input gear wheel of said second transmission gear means with the other bevel gear means, said other bevel gear means carrying external claw clutch means thereon, said equalization gear carrier means being provided with external claw clutch means, means for locking said differential gear means including a shifting sleeve operative to connect with each other said claw clutch means, means including shifting clutch means for selectively connecting said input means with the input gear wheel of said first transmission gear means or with said equalization gear carrier means, said means including said shifting clutch means further comprising a shaft secured to said carrier means, a clutch member fixed on said shaft, a clutch member fixed to said input gear wheel of said first transmission gear means, said shifting clutch means comprising a shiftable clutch member slidably but non-rotatably mounted on said input means and selectively engageable with said first-mentioned clutch member or with said second-mentioned clutch member, and means operatively connecting said differential gear locking means with said shiftable clutch member so that said locking means is effectively disengaged in the neutral position of said shifting clutch means and is effectively engaged upon engagement of said first-mentioned clutch member by said shiftable clutch member.

12. A distributor transmission for multi-axle vehicles, especially trucks, comprising input means, first transmission gear means, second transmission gear means, said first transmission gear means having a plurality of gear wheels including an input gear wheel and an output gear wheel and said second transmission gear means having a plurality of gear wheels including an input gear wheel and an output gear wheel, differential gear means, first output means, second output means operatively connected with the output gear wheel of said second transmission gear means, said first transmission gear means effectively terminating in one of the gear wheels of said second transmission gear means, said differential gear means including equalization gear carrier means, equalization gear means on said carrier means, and two bevel gear means operatively connected with said equalization gear means, said equalization gear carrier means being provided with external claw clutch means, said first output means being operatively connected with one of said bevel gear means, the other of said bevel gear means carrying a claw clutch member thereon and being operatively connected with the input gear of said second transmission gear means, differential gear locking means including shifting sleeve means for connecting said claw clutch means with said claw clutch member, means including shifting clutch means for selectively connecting said input means with the input gear wheel of said first transmission gear means or with said equalization gear carrier means, and lever means operatively connecting said differential gear locking means with said shifting clutch means in such a manner that the former is rendered operative only in the position of the latter providing clutch-connection between said input means and the input gear wheel of said first transmission gear means.

13. A distributor gearing for multi-axle vehicles, comprising input means, first transmission gear means, second transmission gear means, each of said transmission gear means having a plurality of gear wheels, said first transmission gear means effectively terminating in one of the gear wheels of said second transmission gear means, differential gear means including a plurality of elements, first output means operatively connected with one of the elements of said differential gear means, a first one of the gear wheels of said second transmission gear means being operatively connected with another element of said differential gear means, second output means operatively connected with a second gear wheel of said second transmission gear means, third output means adapted to be connected with said second gear wheel of said second transmission gear means, and first clutch means including a movable clutch element for selectively connecting said third output means with said last-mentioned second gear wheel, means including further shifting clutch means for selectively connecting said input means with one of the gear wheels of said first transmission gear means or with a further element of said differential gear means, said means including further shifting clutch means further comprising a shaft secured to said further element, a clutch member fixedly secured to said shaft, a clutch member secured to said one gear wheel of said first transmission means, said further shifting clutch means comprising a shiftable clutch member slidably but non-rotatably mounted on said input means and selectively engageable with said first-mentioned clutch member or with said second-mentioned clutch member, and means operatively connecting said movable clutch element with said shiftable clutch member in such a manner that said first clutch means is automatically engaged upon engagement of said shiftable clutch member with said first-mentioned clutch member.

14. A distributor gearing for multi-axle vehicles, comprising input means, first transmission gear means, second transmission gear means, each of said transmission gear means having a plurality of gear wheels, said first transmission gear means effectively terminating in one of the gear wheels of said second transmission gear means, differential gear means including a plurality of elements, first output means operatively connected with one of the elements of said differential gear means, a first one of the gear wheels of said second transmission gear means being operatively connected with another element of said differential gear means, second output means operatively connected with a second gear wheel of said second transmission gear means, third output means, clutch means for selectively connecting said third output means with said second gear wheel of said second transmission gear means, differential gear locking means for effectively and selectively locking said differential gear means, said locking means including clutch elements on two of said elements selectively connectable by a shifting sleeve, means operatively connecting said clutch means with said locking means to render the same effectively operative and inoperative substantially in unison, and means including further clutch means including a shiftable clutch member for selectively connecting said input means with one of the gear wheels of said first transmission gear means or with a further element of said differential gear means, said further clutch means comprising a clutch member operatively connected to said further element of said differential gear means, a clutch member fixed to said one of said gear wheels of said first transmission gear means, said shiftable clutch member being slidably but non-rotatably mounted on said input means, said shiftable clutch member being selectively engageable with said first-mentioned clutch member or with said second-mentioned clutch member, and lever means interconnecting said shifting sleeve and said shiftable clutch member for causing connection of said clutch elements on said two of said elements of said differential means by said shifting sleeve upon engagement of said second-mentioned clutch member by said shiftable clutch member.

15. A distributor transmission for multi-axle vehicles, especially trucks, comprising input means, first transmission gear means, second transmission gear means, said first transmission gear means having a plurality of gear wheels including an input gear wheel and an output gear wheel and said second transmission gear means having a plurality of gear wheels including an input gear wheel and an output gear wheel, differential gear means, first output means, second output means operatively connected with the output gear wheel of said second transmission gear means, third output means adapted to be connected with said output gear wheel of said second transmission gear means, first disengageable means for selectively connecting said third output means with the output gear wheel of said second transmission gear means, said first transmission gear means effectively terminating in one of the gear wheels of said second transmission gear means, said differential gear means including equalization gear carrier means, equalization gear means on said carrier means, and two bevel gear means operatively connected with said equalization gear means, said first output means being operatively connected with one of said bevel gear means, the input gear wheel of said second transmission gear means being operatively connected with the other bevel gear means to form a gear group rotating in unison, means including second disengageable means for selectively connecting said input means with the input gear wheel of said first transmission gear means or with said equalization gear wheel carrier means, third disengageable means including cooperating clutch means on said gear carrier means and on said other bevel gear means for effectively locking said differential gear means to rotate as a unit, and means operatively connecting said disengageable means with each other in such a manner that said first and third disengageable means are engaged automatically with said second disengageable means operative to connect said input means with the input gear wheel of said first transmission gear means.

16. A distributor transmission for multi-axle vehicles, especially trucks, comprising input means, first transmission gear means, second transmission gear means, said first transmission gear means having a plurality of gear wheels including an input gear wheel and an output gear wheel and said second transmission gear means having a plurality of gear wheels including an input gear wheel and an output gear wheel, differential gear means, first output means, second output means operatively connected with the output gear wheel of said second transmission gear means, third output means adapted to be connected with said one output gear wheel of said second transmission gear means, clutch means for selectively connecting said third output means with said output gear wheel of said second transmission gear means, said first transmission gear means effectively terminating in one of the gear wheels of said second transmission gear means, said differential gear means including equalization gear carrier means provided with a shaft, equalization gear means on said carrier means, and two bevel gear means operatively connected with said equalization gear means, said first output means being operatively connected with one of said bevel gear means, the input gear wheel of said second transmission gear means being operatively connected with the other bevel gear means to form a unitary gear group rotatably supported about said shaft, said equalization gear carrier means and one of the elements of said unitary gear group being provided with claw clutch means, differential gear locking means including shifting sleeve means for operatively connecting said two claw clutch means with each other, means including shifting clutch means for selectively connecting said input means with the input gear wheel of said first transmission gear means or with said equalization gear wheel carrier means, said shifting clutch means having also a neutral position, and means operatively interconnecting said shifting clutch means with said first-named clutch means and said locking means in such a manner that the latter two are rendered ineffective with said shifting clutch means in said neutral position and are effectively rendered operative with said shifting clutch means in a position operatively connecting said input means with the input gear wheel of said first transmission gear means.

17. A distributor transmission for multi-axle vehicles, especially trucks, comprising input shaft means, first transmission gear means, second transmission gear means, said first transmission gear means having a plurality of gear wheels including an input gear wheel rotatably mounted on said input shaft means and an output gear wheel and said second transmission gear means having a plurality of gear wheels including an input gear wheel and an output gear wheel, differential gear means, first output means for a first rear axle, second output means for a second rear axle and operatively connected with the output gear wheel of said second transmission gear means, third output means for a front axle and adapted to be connected with said one output gear wheel of said second transmission gear means, clutch means for selectively connecting said third output means with said output gear wheel of said second transmission gear means, said first transmission gear means effectively terminating in one of the gear wheels of said second transmission gear means, said differential gear means including equalization gear carrier means provided with a shaft, equalization gear means on said carrier means, and two bevel gear means operatively connected with said equalization gear means, said first output means being operatively connected with one of said bevel gear means, the input gear wheel of said second transmission gear means being operatively connected with the other bevel gear means to form a unitary gear group rotatably supported about said shaft, said equalization gear carrier means and one of the elements of said unitary gear group being provided with claw clutch means, differential gear locking means including shifting sleeve means for operatively connecting said two claw clutch means with each other, means including shifting clutch means for selectively connecting said input means with the input gear wheel of said first transmission gear means or with said equalization gear wheel carrier means, said shifting clutch means having also a neutral position, and means operatively interconnecting said shifting clutch means with said first named clutch means and said locking means in such a manner that the latter two are rendered ineffective with said shifting clutch means in said neutral position and are effectively rendered operative with said shifting clutch means in a position operatively connecting said input means with the input gear wheel of said first transmission gear means.

18. A distributor transmission for multi-axle vehicles, especially trucks, comprising input shaft means, first transmission gear means, second transmisison gear means, said first transmission gear means having a plurality of gear wheels including an input gear wheel rotatably mounted on said input shaft means and an output gear wheel and said second transmission gear means having a plurality of gear wheels including an input gear wheel and an output gear wheel, differential gear means, first output means for a first rear axle, second output means for a second rear axle and operatively connected with the output gear wheel of said second transmission gear means, third output means for a front axle and adapted to be connected with said one output gear wheel of said second transmission gear means, clutch means for selectively connecting said third output means with said output gear wheel of said second transmission gear means, said first transmission gear means effectively terminating in one of the gear wheels of said second transmisison gear means, said differential gear means including equalization gear carrier means provided with a shaft, equalization gear means on said carrier means, and two bevel gear means operatively connected with said equalization gear means, said first output means being operatively connected with one of said bevel gear means, the input gear wheel of said second transmission gear means being operatively connected with the other bevel gear means to form a unitary gear group rotatably supported about said shaft, said equalization gear carrier means and one of the elements of said unitary gear group being provided with claw clutch means, differential gear locking means including shifting sleeve means for operatively connecting said two claw clutch means with each other, means including shifting clutch means for selectively connecting said input means with the input gear wheel of said first transmission gear means or with said equalization gear wheel carrier means, said shifting clutch means having also a neutral position intermediate said last-mentioned input gear and said shaft, and means operatively interconnecting said shifting clutch means with said first-mentioned clutch means and said locking means in such a manner that the latter two are rendered ineffective with said shifting clutch means in said neutral position and are effectively rendered operative with said shifting clutch means in a position operatively connecting said input means with the input gear wheel of said first transmission gear means, said first transmission gear means effectively providing a speed reduction and said second transmission gear means providing a 1:1 transmission ratio.

19. A distributor change-speed gearing for multi-axle vehicles, comprising input means, first transmission gear means, second transmission gear means, each of said transmission gear means having a plurality of gear wheels including an input gear wheel and an output gear wheel, said first transmission gear means effectively terminating in one of the gear wheels of said second transmission gear means and providing a speed reduction, differential gear means including a plurality of elements and provided with differential locking means, first output means operatively connected with one of the elements of said differential gear means, a first one of the gear wheels of said second transmission gear means being operatively connected with another element of said differential gear means, second output means operatively connected with a second gear wheel of said second transmisison gear means, third output means, engageable means for selectively connecting said third output means with said second gear wheel of said second transmission gear means, means including further engageable means for selectively connecting said input means with one of the gear wheels of said first transmission gear means or with a further element of said differential gear means, said means including further engageable means further comprising a shaft operatively connected to said further element of said differetnial gear means, said further engageable means comprising a clutch member fixed to said shaft, a clutch member fixed to said one of the gear wheels of said first transmission gear means, a shiftable clutch member slidably but non-rotatably mounted on said input means and selectively engageable with said first-mentioned clutch member or with said second-mentioned clutch member, and control means operatively interconnecting said first-mentioned engageable means, said shiftable clutch member and said locking means in such a manner that said third output means is operatively connected with said second gear wheel of said second transmission gear means and said locking means is rendered operative upon engagement of said first-named clutch member by said shiftable clutch member.

20. A distributor gearing for multi-axle vehicles, comprising input means, first transmission gear means, second transmission gear means, each of said transmission gear means having a plurality of gear wheels, said first transmission gear means effectively terminating in one of the gear wheels of said second transmission gear means, differential gear means including a plurality of elements, first output means operatively connected with one of the elements of said differential gear means, a first one of the gear wheels of said second transmission gear means being operatively connected with another element of said differential gear means, second output means operatively connected with a second gear wheel of said second transmission gear means, and means including shifting means for selectively connecting said input means with one of the gear wheels of said first transmission gear means or with a further element of said differential gear means, said further element of said differential gear means comprising equalization gear carrier means, said means including shifting means further including a shaft fixed to said equalization gear carrier means, a clutch member fixed to said shaft, a clutch member secured to said one of the gear wheels of said first transmission gear means, said shifting means comprising a shiftable clutch member mounted on said input means for slidable but non-rotatable movement relative thereto, said shiftable clutch member being selectively engageable with said first-mentioned clutch member or with said second-mentioned clutch member, the gear wheels of said first and second transmission gear means being so constructed that a speed-reduction is obtained in the transmission of torque through said first transmission gear means while a substantially 1:1 ratio is effective during transmission of torque through said second transmission gear means.

References Cited in the file of this patent

UNITED STATES PATENTS

| | | |
|---|---|---|
| 1,317,286 | Gunderson | Sept. 30, 1919 |
| 1,362,490 | Keck | Dec. 14, 1920 |
| 2,228,581 | Olen | Jan. 14, 1941 |
| 2,449,546 | Buckendale et al. | Sept. 21, 1948 |